United States Patent
Khakhalev (10) Patent No.: US 9,805,877 B2
(45) Date of Patent: Oct. 31, 2017

(54) COLLECTOR PLATE FOR ENERGY STORAGE DEVICE AND METHODS OF MANUFACTURING

(71) Applicant: Maxwell Technologies, Inc., San Diego, CA (US)

(72) Inventor: Alexander D. Khakhalev, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 634 days.

(21) Appl. No.: 14/246,661

(22) Filed: Apr. 7, 2014

(65) Prior Publication Data

US 2014/0308554 A1    Oct. 16, 2014

Related U.S. Application Data (60) Provisional application No. 61/810,650, filed on Apr. 10, 2013.

(51) Int. Cl.
| | |
|---|---|
| *H01M 4/04* | (2006.01) |
| *H01M 10/0587* | (2010.01) |
| *H01G 9/00* | (2006.01) |
| *H01G 9/048* | (2006.01) |
| *H01G 11/72* | (2013.01) |
| *H01G 11/82* | (2013.01) |
| *H01G 11/84* | (2013.01) |
| *H01M 2/26* | (2006.01) |

(52) U.S. Cl.
CPC ............ *H01G 9/048* (2013.01); *H01G 9/0029* (2013.01); *H01G 11/72* (2013.01); *H01G 11/82* (2013.01); *H01G 11/84* (2013.01); *H01M 4/043* (2013.01); *H01M 4/0471* (2013.01); *H01M 10/0587* (2013.01); *H01M 2/26* (2013.01); *H01M 2/263* (2013.01); *Y02E 60/13* (2013.01); *Y10T 29/417* (2015.01); *Y10T 29/4911* (2015.01); *Y10T 29/49108* (2015.01); *Y10T 29/49114* (2015.01)

(58) Field of Classification Search
None
See application file for complete search history.

(56) References Cited

U.S. PATENT DOCUMENTS

| | | | |
|---|---|---|---|
| 6,284,408 B1 | 9/2001 | Akazawa et al. | |
| 6,896,993 B2 | 5/2005 | Hozumi et al. | |
| 7,440,258 B2 | 10/2008 | Thrap et al. | |
| 8,092,934 B2 | 1/2012 | Fresard et al. | |
| 2005/0147878 A1* | 7/2005 | Miyahisa | H01M 2/027 429/174 |
| 2005/0260487 A1 | 11/2005 | Kim et al. | |
| 2006/0024572 A1* | 2/2006 | Lee | H01M 10/0431 429/161 |
| 2006/0203429 A1 | 9/2006 | Thrap et al. | |
| 2006/0281252 A1 | 12/2006 | Oversteyns | |
| 2009/0303659 A1 | 12/2009 | Zhong et al. | |
| 2012/0171525 A1 | 7/2012 | Guen | |

FOREIGN PATENT DOCUMENTS

| | | |
|---|---|---|
| JP | 2000 260417 | 9/2000 |
| JP | 2001 256954 | 9/2001 |
| JP | 2008 066040 | 3/2008 |
| WO | WO 2012/090599 | 7/2012 |

\* cited by examiner

*Primary Examiner* — Ladan Mohaddes
(74) *Attorney, Agent, or Firm* — Knobbe Martens Olson & Bear LLP (57) ABSTRACT

This disclosure provides collector plates for an energy storage device, energy storage devices with a collector plate, and methods for manufacturing the same. In one aspect, a collector plate includes a body. One or more apertures extend into the body. The apertures are configured to allow a portion of a free end of a spirally wound current collector of a spirally wound electrode for an energy storage device to extend into the one or more apertures.

26 Claims, 11 Drawing Sheets

FIG. 10

COLLECTOR PLATE FOR ENERGY STORAGE DEVICE AND METHODS OF MANUFACTURING

CROSS REFERENCE TO RELATED APPLICATIONS

This application claims the benefit of U.S. Provisional Patent Application Ser. No. 61/810,650, filed Apr. 10, 2013, entitled "COLLECTOR PLATE FOR ENERGY STORAGE DEVICE AND METHODS OF MANUFACTURING," which is hereby incorporated herein by reference in its entirety.

BACKGROUND

Field

The present disclosure relates generally to a collector plate for an energy storage device, such as a capacitor, and methods of manufacturing the same. More specifically, the disclosure relates to a collector plate that can be reliably attached within the energy storage device and improve electrolyte flow into the energy storage device.

Description of the Related Art

Many energy storage devices include a conductive collector plate that provides electrical communication between an electrode assembly and a terminal of the device. However, it can be difficult to design collector plates which are reliable and simple to manufacture.

Many different types of energy storage devices, such as capacitors, fuel cells, batteries, and the like, are known. Conventional energy storage devices typically comprise a container housing two or more electrodes, that are often spirally wound together to form an electrode assembly that is referred to by a person having ordinary skill in the art as a "jellyroll." An electrolyte is injected through a port in the container, under pressure, to impregnate the jellyroll with electrolyte in the container. Conventional energy storage devices often include one or more conductive collector plates, each of which acts as an intermediary structure to provide electrical communication between an electrode of the jellyroll and a terminal of the energy storage device. Conventional collector plates also include a small aperture which is intended to allow flow of electrolyte from the port in the container, through the collector plate, and to the jellyroll.

Conventional collector plates include a planar lower surface which is pressed against a jellyroll to partially curve and bend all the ends of the jellyroll. Welds are made between the curved, bent ends and the collector plate to mechanically and electrically connect the collector plate with the jellyroll. Prior to welding, the bent ends of the jellyroll are typically scored to improve the electrical contact between the jellyroll and the collector plate. However, the welds often fail when subjected to transverse or radial forces.

The size of the aperture extending through conventional collector plates for electrolyte impregnation is generally small. It was thought that the aperture needed to be just large enough in size to allow electrolyte to flow through the collector plate during jellyroll impregnation, but sufficiently small to allow the lower surface of the collector plate to partially bend the ends of the jellyroll over, as described above. Additionally, the apertures were kept small to maintain the increased rigidity of the collector plate, which was thought to be needed in order to support the forces in bending the ends of the jellyroll, and to provide resistance to external shearing forces. A problem with these conventional systems was that the bent ends of the jellyroll would cover the aperture in the collector plate, preventing electrolyte from flowing through the aperture and into the jellyroll. The bent ends of the jellyroll would also cover the gaps between the current collector layers in the jellyroll, preventing electrolyte from flowing longitudinally into these gaps, and thus preventing electrolyte impregnation.

SUMMARY

The systems, methods and devices of this disclosure each have several innovative aspects, no single one of which is solely responsible for the desirable attributes disclosed herein.

One innovative aspect of the subject matter described in this disclosure can be implemented in a collector plate for an energy storage device. The collector plate includes a body and one or more apertures extending into the body. The apertures are configured to allow a portion of a free end of a current collector of a spirally wound or stacked electrode for an energy storage device to extend into the one or more apertures.

Another innovative aspect of the subject matter described in this disclosure can be implemented in an energy storage device. The energy storage device includes an electrode, a container and a collector plate. The electrode includes a current collector that includes a plurality of laterally spaced layers forming a free end. The container is configured to receive the electrode and an electrolyte. The collector plate includes a body with an aperture extending into a lower surface of the body. The aperture is configured to provide flow through the body. A first portion of the free end of the current collector extends into the aperture when the current collector is pressed against the collector plate.

Another innovative aspect of the subject matter described in this disclosure can be implemented in a method of manufacturing an energy storage device. The method includes providing an electrode comprising a current collector, the current collector comprising a plurality of laterally spaced layers forming a free end. The method further includes providing a collector plate comprising a body with an aperture extending into a lower surface of the body. The method further includes pressing the collector plate against the electrode, such that a first portion of the free end of the current collector extends into the aperture.

Another innovative aspect of the subject matter described in this disclosure can be implemented in an energy storage device. The energy storage device includes an electrode, a container, and a collector plate. The electrode includes a current collector. The current collector includes a plurality of laterally spaced layers forming a free end. The container is configured to receive the electrode and an electrolyte. The collector plate includes a body with a protrusion extending from a lower surface of the body. The protrusion is configured to penetrate the free end of the current collector when the current collector is pressed against the collector plate. In some embodiments, the protrusion is approximately centered on the lower surface of the body. In some embodiments, the protrusion comprises a protrusion body with sides that extend approximately orthogonally from the lower surface of the body. In some embodiments, the protrusion comprises two or more arms extending from the lower surface of the body. In some embodiments, the protrusion comprises an inwardly-extending portion to wrap around a portion of the free end of the current collector. In some embodiments, the energy storage device further comprises an aperture extending into the lower surface of the body, and configured to provide flow through the body, wherein a first portion of the free end of the current collector extends into the aperture when the current collector is pressed against the collector plate.

Details of one or more implementations of the subject matter described in this disclosure are set forth in the accompanying drawings and the description below. Although the examples provided in this disclosure are primarily described in terms of an electrode for a capacitor or ultracapacitor, the concepts provided herein may apply to other types of electrodes for other energy storage devices, such as batteries, fuel cells, etc. Other features, aspects, and advantages will become apparent from the description, the drawings and the claims. Note that the relative dimensions of the following figures may not be drawn to scale, and reference numerals used with reference to a material within a component should not limit the structure, composition, state, or other characteristic of the material.

BRIEF DESCRIPTION OF THE DRAWINGS

Like reference numbers and designations in the various drawings indicate like elements.

DESCRIPTION

Described herein are embodiments of capacitor collector plates that are reliable and designed for more efficient manufacturing and assembly within an energy storage device. The collector plates can include one or more apertures extending into or through a collector plate body. The apertures can be sized and shaped to allow a portion of a jellyroll electrode for an energy storage device to extend into or through the apertures, to allow flow of electrolyte through the apertures and into the jellyroll, with increased flow. In some embodiments, the apertures allow the portion of the electrode to extend into, or through, the apertures without being substantially bent or crushed by the edges of the apertures along a lower surface of the collector plate. Embodiments of the collector plates described herein can increase the flow of electrolyte into an energy storage device, with reduced times for jellyroll impregnation (saturation) and assembly of the device. In one embodiment, the time for jellyroll electrolyte saturation of an energy storage is reduced from about 15 minutes to as little as 15 seconds.

The larger apertures in the collector plate also provide a decreased contact area between the jellyroll and the collector plates. This decreased contact area causes increased forces against selective portions of the ends of the jellyroll, when the jellyroll and collector plate are pressed together. These increased forces cause the selective portions to flatten, which provides a flatter, more reliable surface for attaching the jellyroll and the collector plate. Alternative embodiments described herein include a protrusion extending from the collector plate, which can extend into a portion of the jellyroll during assembly, to provide additional stability and support between the collector plate and jellyroll attachment.

Figure 1A:
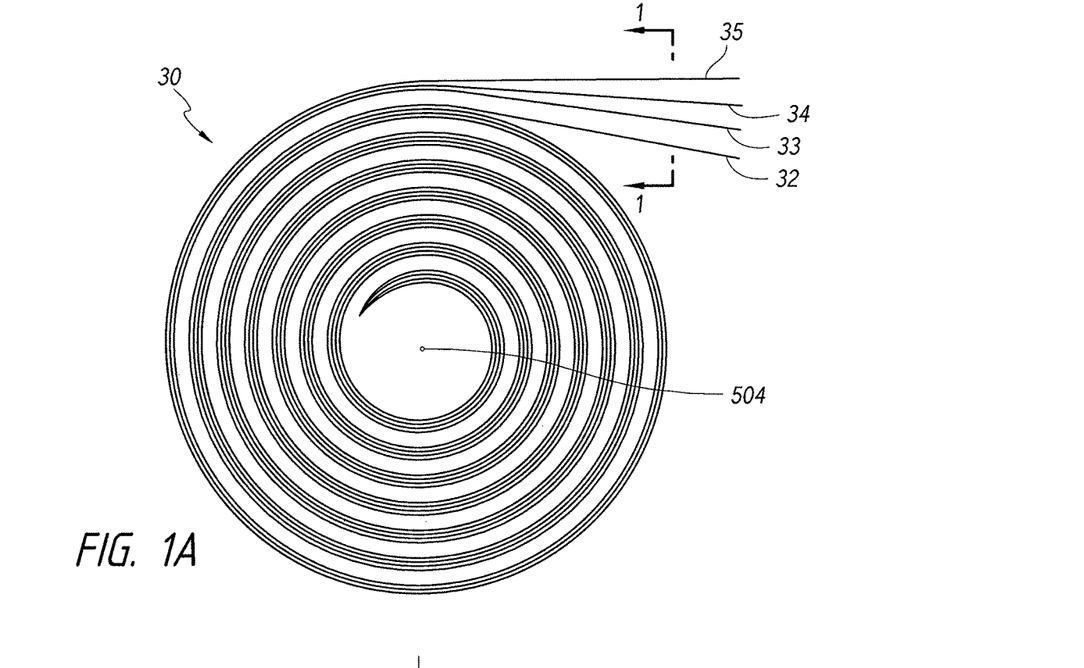
FIGS. 1A-1B are top and isometric views, respectively, of an embodiment of a jelly roll electrode.

FIG. 1A is a top view of an embodiment of a jellyroll 30 that can be implemented within an energy storage device, such as a capacitor. The jellyroll 30 can have two or more electrodes, such as a first electrode 32 and a second electrode 34. First electrode 32 can be capable of storing a negative charge and second electrode 34 can be capable of storing a positive charge, or vice versa. The first electrode 32 and second electrode 34 can be spirally wound about a longitudinal axis 504 to form the jellyroll 30.

The jellyroll 30 can include one or more dielectric separators that allow ionic flow therethrough, while providing electrical isolation and preventing contact between components of an energy storage device. Such contact could result in a short circuit and rapid depletion of the charges stored in the electrodes. For example, a first dielectric separator 33 can be positioned between the first electrode 32 and the second electrode 34 to prevent the first electrode 32 and the second electrode 34 from contacting one another. In some embodiments, a second dielectric separator 35 can form an outer isolating layer around at least a portion of the jellyroll 30 to isolate the portion of the jellyroll 30 from at least a portion of a container of an energy storage device. For example, the second dielectric separator 35 can isolate the second electrode 34 from an inner sidewall of a container of an energy storage device.

The dielectric separators 33, 35 can comprise any of a number of different materials and structures suitable to allow ionic currents to flow through electrolyte between the electrodes 32, 34, while preventing electronic currents and shorting between the electrodes 32, 34. The separators typically comprise an insulating film. The separators 33, 35 may include one or more ceramics, paper, polymers, polymer fibers, glass fibers, and the like. One or more of the separators 33, and electrodes 32, 34 can comprise a porous and/or perforated material, to facilitate impregnation by electrolyte.

Figure 1B:
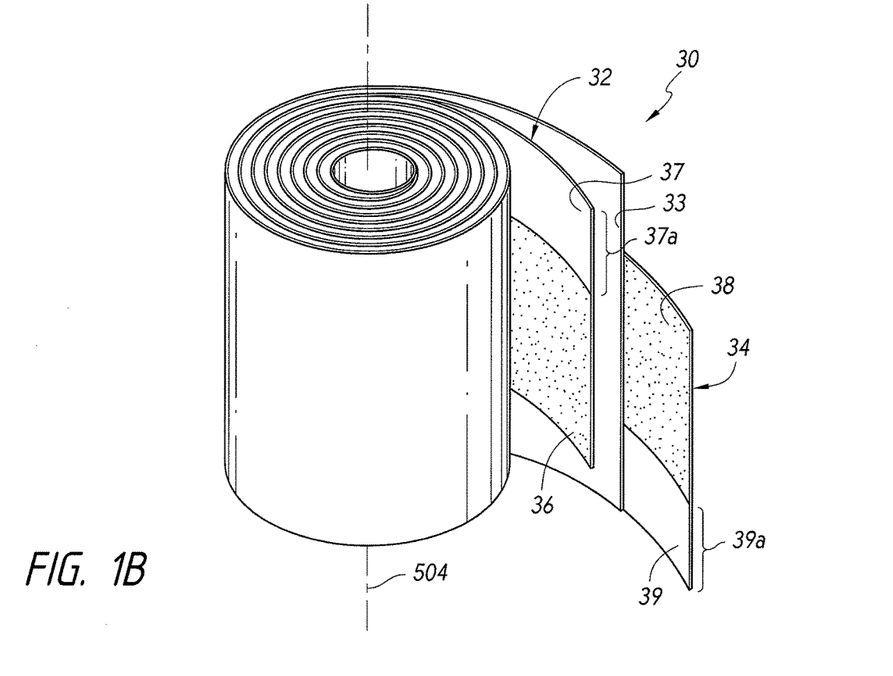

FIG. 1B is an isometric view of the jellyroll 30 of FIG. 1A. The first electrode 32 can include an electrode layer 36 attached to and in electrical communication with a current collector 37. Similarly, the second electrode 34 can include an electrode layer 38 attached to and in electrical communication with a current collector 39. The current collectors 37, 39 can be configured to transmit an electrical charge stored by electrode layers 36, 38, to corresponding terminals in an energy storage device, as described further below. It will be understood that any of a number of different combinations, quantities and configurations of electrode film layers, current collectors, dielectric layers, and/or other components known in the art can be employed to form jellyroll 30.

For example, the electrode layers 36, 38 can comprise any of a number of different materials and configurations known in the art, and can comprise the same or different material with respect to each other. Generally the electrode layers 36, 38 comprise at least an active material used for its increased energy storage capacity, such as activated carbon. Other activated materials may be used, such as manganese oxide, ruthenium oxide, other pseudocapacitive materials, or Li, K, Na, Mg metal or mixed metal oxide cathode materials such as $LiCoO_2$, $LiMn_2O_4$, $LiMnO_2$, $LiNiO_2$, $LiV_2O_2$, $V_2O_5$, $LiFePO_4$, layered or mix metal oxides such as $LiNi_{0.3}Mn_{0.3}Co_{0.3}O_2$, $LiNi_{0.8}Co_{0.2}Al_{0.05}O_2$, nanoparticle platinum group metal coated carbons, and mix precious metal coated carbons, silicon, tin, nickel, titanium oxides or dioxide, or other activated materials suitable for use in a capacitor, battery, fuel cell, or other energy storage device. The active material can comprise a range of particle sizes, to allow for an efficient packing density; small particles pack within interstitial areas defined as the voids or pores created between larger particles. The pores can also increase the effective surface area of electrode layers 36, 38, resulting in increased energy storage capacity. The region between the electrodes 32, 34, as well as the available voids within the electrodes 32, 34, can be filled with the electrolyte 40, to allow the flow of ions between the electrode layers 36, 38 and the current collectors.

The electrode layers 36, 38 can comprise any of a number of other components. For example, the electrode layers 36, 38 can include conductive material, such as conductive carbon, graphite, graphene, aluminum, or another conducting metal or material suitable to be used in combination with active material within an energy storage device, to decrease the equivalent series resistance of the electrode layers relative to the activated material alone. One or more binders or other adhesives, such as polymers, thermoplastics, thermoset plastics, resins, or other suitable materials, can be used to adhere the materials of the electrode layers 36, 38 to each other. For example, the electrode layers 36, 38 can comprise a matrix of activated material and binder. Such binders or adhesives can also be used to adhere the electrode layers 36, 38 to one or more of current collectors 37, 39 or dielectric separators 33, 35.

The current collectors 37, 39 can comprise any of a number of different materials and configurations known in the art, and can comprise the same or different material with respect to each other. The current collectors 37, 39 are typically a sheet of conductive material, or a material with a conductive coating, to which the electrode layers 36, 38, respectively, are attached. The current collectors 37, 39 can comprise a sheet, plate, mesh, fabric, foil, or other structures. Suitable materials for current collectors 37, 39 include aluminum, copper, silver, gold, nickel, stainless steel, graphite and other conducting materials. The current collectors 37, 39 can provide support to the electrode layers 36, 38, although electrode layers 36, 38 can be self-supporting films.

Figure 1C:
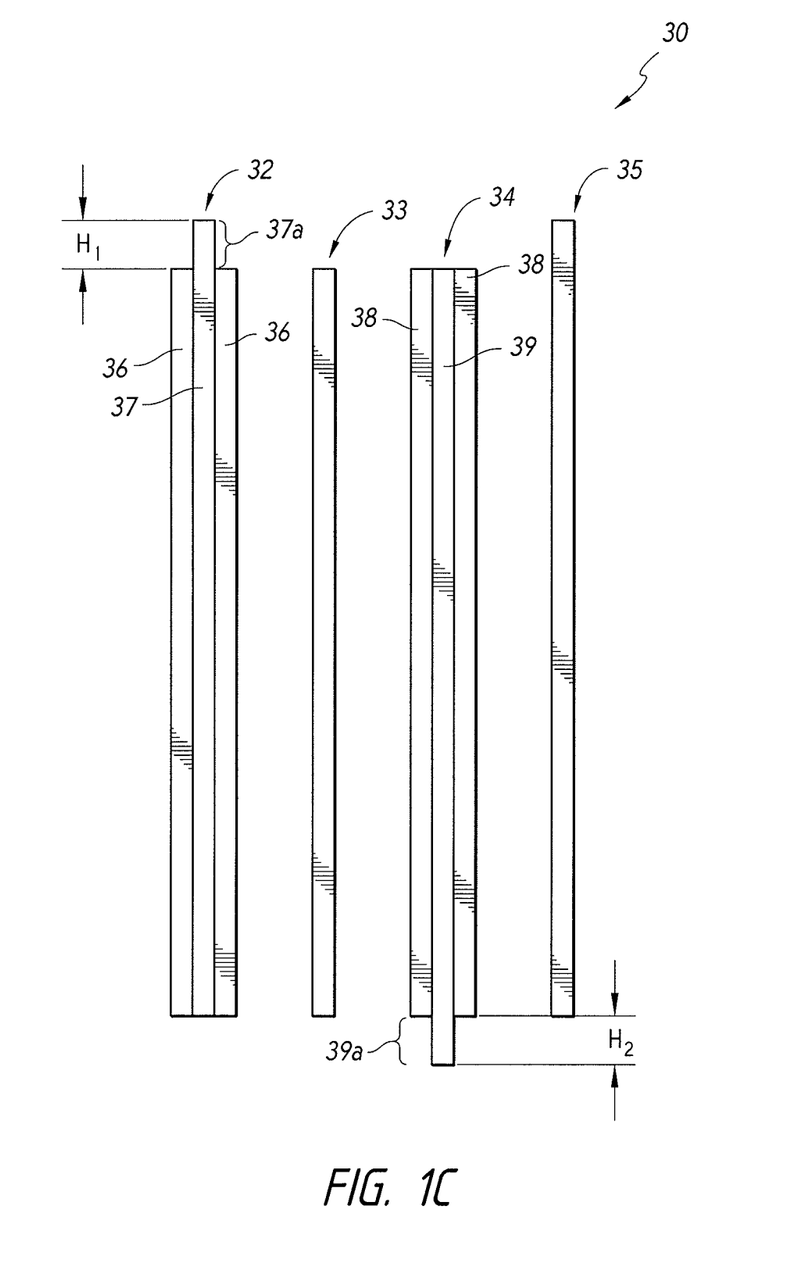
FIG. 1C is a side cross-sectional view of an embodiment of the jelly roll electrode 30 taken along lines 1-1 of FIG. 1A.

FIG. 1C is a side cross-sectional view of an embodiment of the jelly roll electrode 30 taken along lines 1-1 of FIG. 1A. As shown, in some embodiments, the first electrode 32 can include a pair of electrode layers 36 attached to opposed sides of the current collector 37. In some embodiments, the second electrode 34 can include a pair of electrode layers 38 attached to opposed sides of the current collector 39. As such, jelly roll 30 can form a double layer, double sided electrode assembly.

As mentioned above, jelly roll 30 can be configured to transmit an electrical charge stored by electrode layers 36, 38, to corresponding terminals in an energy storage device, as described further below. For example, the current collector 37 can include a free end 37a extending beyond the electrode layer 36 at a first end of the jellyroll 30 by a height $H_1$. The free end 37a can be configured to provide a positive charge to a terminal on an energy storage device. The current collector 39 can include a free end 39a extending beyond the electrode layer 38 at an opposite second end of the jellyroll 30 by a height $H_2$. The free end 39a can be configured to provide a negative charge to a terminal on an energy storage device.

Figure 2:
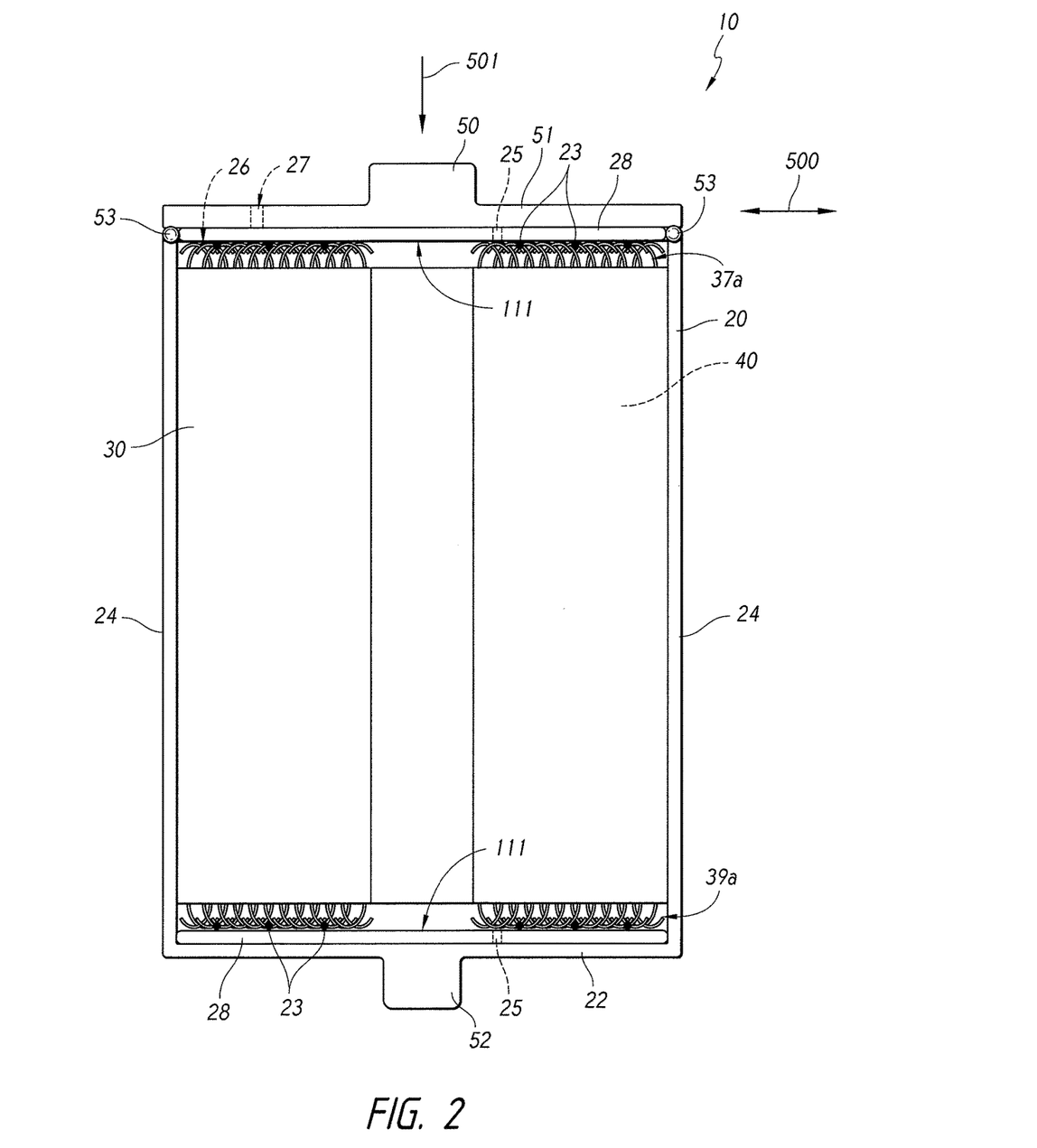
FIG. 2 is a cross sectional side view of an energy storage device, according to an embodiment.

FIG. 2 is a cross sectional side view of an energy storage device, according to an embodiment. The energy storage device can comprise a capacitor 10. The capacitor 10 can comprise a container 20 housing two or more electrodes, such as jellyroll 30. The jellyroll 30 can be immersed in an electrolyte 40 in container 20.

The electrodes 32, 34 of jellyroll 30 can be attached to and in electrical communication with a first electrical terminal 50 and a second electrical terminal 52, respectively, of the energy storage device 10. Such electrical communication can be provided through the current collectors 37, 39, which are configured to transmit the charge stored within the electrode layers 36, 38, via a current to the terminals 50, 52, respectively. The terminals 50, 52 can be provided in different shapes, sizes, and orientations, and can have an external surface that may be threaded or smooth.

The electrical communication between the current collectors 37, 39 and the terminals 50, 52 can be provided through direct attachment of the current collectors 37, 39 to the terminals 50, 52, or through attachment to one or more intervening structures. For example, the free end 37a can attach to terminal 50 and the free end 39a can attach to terminal 52. The free end 37a can be configured to provide a positive charge to terminal 50, and the free end 39a can be configured to provide a negative charge to terminal 52.

Container 20 is typically made of a conductive material, such as a metallic material. Container 20 can comprise any of a number of different shapes, such as a cylinder, suitable to receive the jellyroll 30. Container 20 can comprise a conductive base 22 and one or more walls 24 that define an opening 26 within which jellyroll 30 can be inserted. Jellyroll 30 can be positioned within container 20 such that the free end 39a of first current collector 39 is in electrical communication with base 22, thereby allowing current to flow from the electrode 34 to the terminal 52 through base 22. In some embodiments, the free end 39a of current collector 39 can contact one or more intervening structures, such as a collector plate 28, which in turn contacts and is in electrical communication with the base 22 of container 20. The free end 39a of current collector 39 can be crushed against base 22 or the collector plate 28, so as to increase the contact area with base 22 or the collector plate 28, and to provide a more uniform surface for attachment, as described further below. In some embodiments, a second collector plate 28 can be similarly configured to contact the free end 37a of the current collector 37, which in turn provides electrical communication between the electrode 32 and the terminal 50. The second collector plate 28 can be in electrical communication with the terminal 50 through direct contact with terminal 50, or through one or more intervening structures. The free end 37a can be similarly crushed against collector plate 28 to increase contact area and to provide a more uniform attachment surface.

Jellyroll 30 can be enclosed within container 20 in a number of different ways. In some embodiments, container 20 can comprise a lid 51 configured to cover opening 26 and enclose the jellyroll 30 within container 20. The lid 51 can be attached to the container 20 with any of a number of attachment mechanisms, such as threads, a shrink or interference fit, welds, crimps, etc. For example, lid 51 can be restrained by rolling one or more portions of walls 24 over lid 51, or by forming one or more crimps in walls 24. In some embodiments, lid 51 can sealingly enclose container 20.

Lid 51 can be in electrical communication with terminal 50. Lid 51 can be integrally or separately formed with respect to terminal 50. Lid 51 is generally electrically isolated from at least a portion of the remainder of container 20, such as sidewalls 24, due to the opposite polarity between terminal 50 and terminal 52. For example, an o-ring 53 can be positioned between lid 51 and the sidewalls 24, and create an electrical isolation barrier between the negatively charged wall 24 and the positively charged end of jelly roll 30, thereby preventing an electrical shorting of capacitor 10. The o-ring 53 can also seal container 20, to prevent leaks of electrolyte 40 from container 20, and prevent contaminates from entering into container 20. It will be understood that one or more additional o-rings or other suitable structures can be used to further seal and/or electrically isolate the lid 51 with respect to the remainder of container 20. O-ring 53 can comprise rubber, polytetrafluoroethylene (PTFE), or other materials suitable for providing a seal and/or electrical isolation.

Container 20 can comprise one or more ports 27 for injecting the electrolyte 40 into container 20. Port 27 may extend through a portion of the lid 51, as shown in FIG. 2, or may be situated in base 22, sidewall 24, or elsewhere in container 20. Further, port 27 may be sealed in different ways after inserting the electrolyte 40. In one embodiment, port 27 may be threaded and be sealed by means of a screw, with an O-ring and a washer concentrically positioned between the head of the screw and the lid. In another variant of the present embodiment, port 27 may be sealed by a rivet. In some embodiments, container 20 can comprise one or more pressure-relief ports, valves, or other suitable structure configured to release pressure due to an over-pressure condition within container 20, to prevent or at least delay an explosion of capacitor 10.

Continuing to refer to FIG. 2, the collector plate 28 can be any of a number of different shapes and materials suitable to provide support to the ends of jelly roll 30, and conduct current from jelly roll 30 to terminal 50 or 52. The collector plate 28 can include a substantially flat lower surface 111, to allow the collector plate 28 to crush and bend over a portion of the ends 37*a* of the current collector 37. The "lower" surface of the collector plates as used herein refers to the inner surface of the collector plate configured to face the jelly roll when installed within an energy storage device, and should not otherwise be limited to the orientation of the collector plate at the top or bottom of the energy storage device. The curved, outwardly facing portions of the bended ends 37*a* can be attached to the collector plates 28 with an attachment mechanism 23. The collector plates 28 can be attached to the crushed ends 37*a* of the current collector 37 with attachment mechanism 23 through welding, brazing or other attachment techniques. In some embodiments, laser welding can be used. The welds may be subject to radial or transverse forces, as shown by the directional arrows 500.

The collector plate 28 can include an aperture 25 extending through its thickness, to allow flow of electrolyte from the port 27 in the capacitor lid 51, and into the jellyroll 30. The aperture 25 may also allow escape of pressurized gas, which may be released when the electrolyte is entering container 20 and impregnating the jellyroll 30. In conventional collector plates, the aperture extending through the collector plate allowed electrolyte flow through the collector plate during jellyroll impregnation, but the aperture was small relative to the overall surface area of the collector plate, to allow contact with the lower surface of the collector plate, to partially bend the ends of the jellyroll over, as shown and described above.

Figure 3:
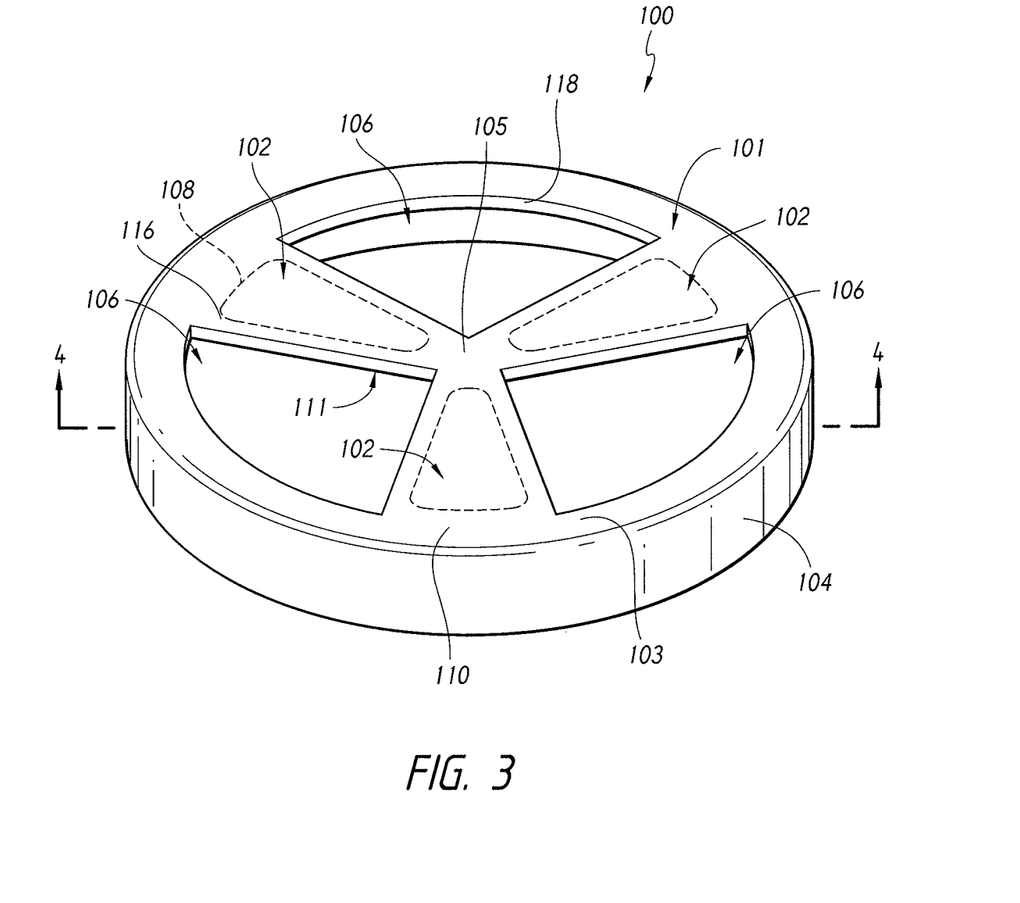
FIG. 3 is a top isometric view of an embodiment of a collector plate.

FIG. 3 is a top isometric view of an embodiment of a collector plate 100. The collector plate 100 can include a body 101 and one or more apertures 106 extending into a lower surface 111 of the body 101. The aperture 106 can extend completely through a thickness of the body 101, from the lower surface 111, and through an upper surface 116 of body 101. In some embodiments, aperture 106 can extend partially into the lower surface of body 101, without extending completely through body 101. For example, a larger aperture can extend through the lower surface of the collector plate body, with a plurality of smaller apertures extending from the larger aperture to the upper surface of the collector plate body, to provide fluid communication through the collector plate.

Figure 4:
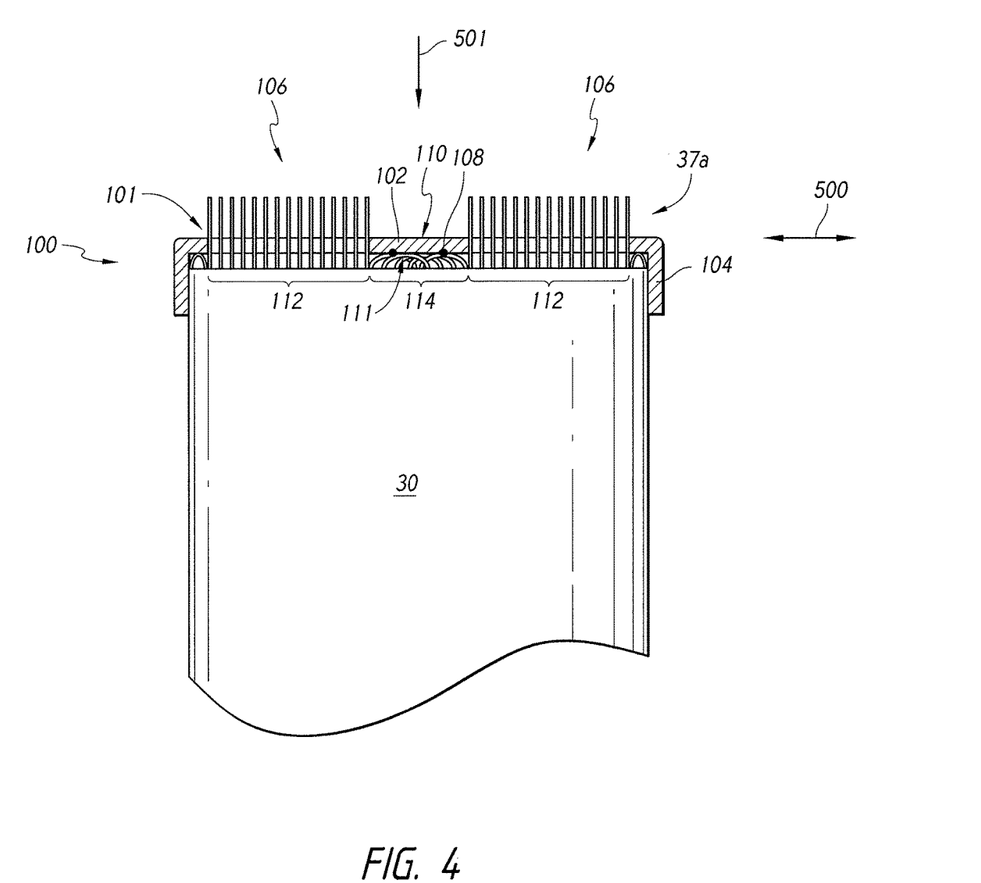
FIG. 4 is a partial side cross-sectional view of an embodiment of the collector plate of FIG. 3 engaged with a jellyroll.
Figure 5:
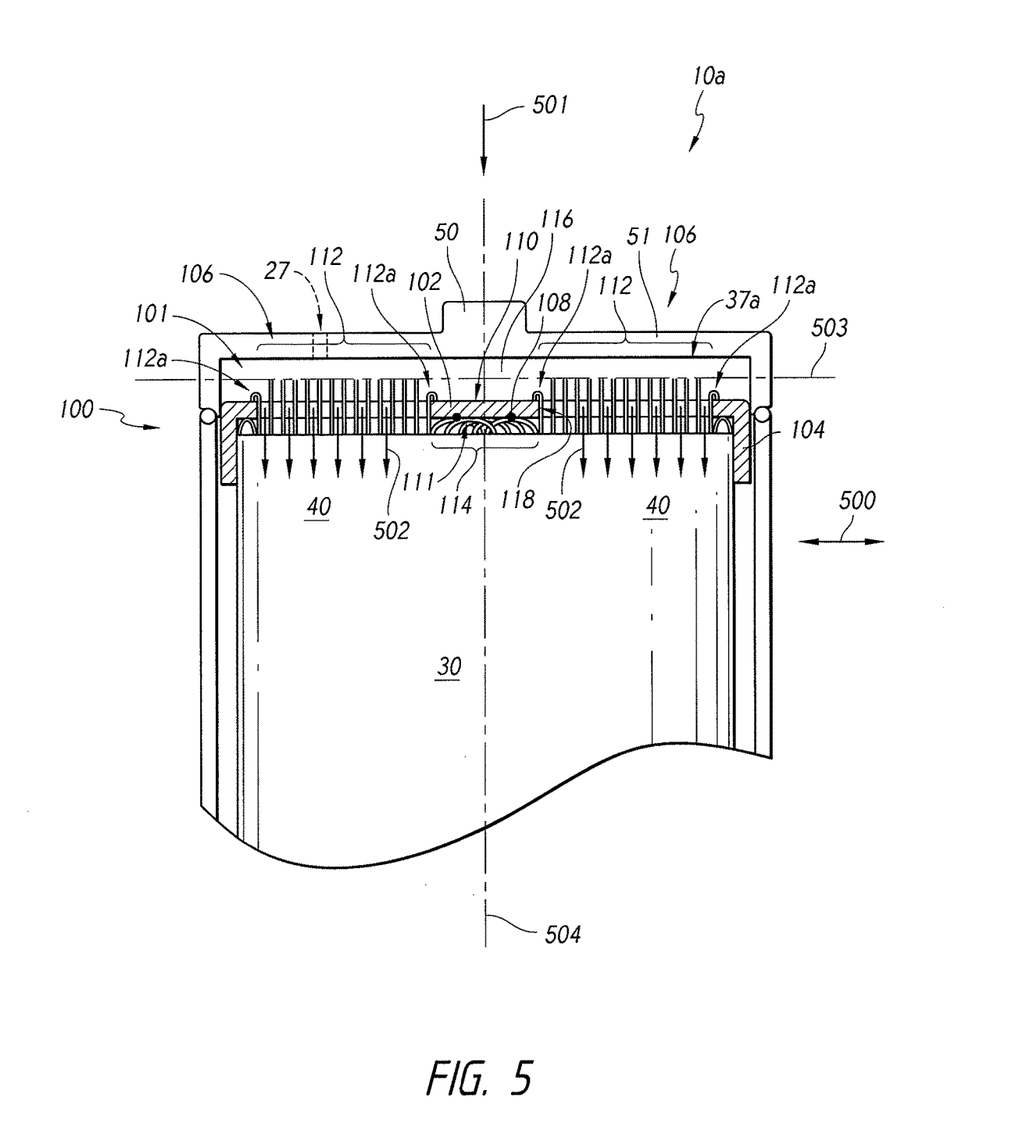
FIG. 5 is a partial side cross-sectional view of an embodiment of an energy storage device including the collector plate and jellyroll of FIG. 4.

The collector plate 100 can include support members 102, 103 extending between and/or around the aperture 106, to provide structural support and rigidity to body 101. Support members 102, 103 can include an inner surface 118 that forms an inner-facing perimeter around each of aperture 106. The collector plate 100 can include a sidewall 104 extending longitudinally from body 101, to engage the collector plate 100 with the jellyroll 30 and/or the lid 51 (FIGS. 4 and 5). Sidewall 104 can extend from an outer perimeter of body 101 as shown, or can extend from a position along body 101 inward from the outer perimeter of body 101. Other lips, flanges or other suitable structures in addition to or as an alternative to sidewall 104 can be used to provide such engagement.

FIG. 4 is a partial side cross-sectional view of an embodiment of the collector plate 100 engaged with the jellyroll 30. The aperture 106 and support member 102 can be configured to allow some portions 112 of the free ends 37*a* of the current collector 37 of jellyroll 30 to extend into or through the collector plate 100, and other portions 114 of the free ends 37*a* to contact or press against the lower surface 111 of collector plate 100.

The aperture 106 can be configured to allow a first portion 112 of free ends 37*a* to extend into collector plate 100 when collector plate 100 is pressed longitudinally against the jellyroll 30 in the direction shown by arrow 501. As such, one or more first portions 112 can be generally longitudinally aligned with respective apertures 106 of collector plate 100. First portions 112 can be radially and/or circumferentially offset relative to the support members 102. The lower surface 111 of support members 102, 103 can substantially prevent a second portion 114 of free ends 37*a* from extending into collector plate 100, when collector plate 100 is pressed longitudinally against the jellyroll 30, as described further below.

Apertures 106 can allow portions 112 of free ends 37*a* to extend into apertures 106 without extending completely through body 101. In some embodiments, apertures 106 can allow the portions 112 to extend through aperture 106. For example, apertures 106 can extend from a lower surface 111 of body 101, through the thickness of body 101, and through an upper surface 110 of body 101, as shown. In some embodiments, the apertures 106 can be configured to allow portions 112 of free ends 37*a* to extend through the collector plate 100 without substantially contacting or bending against the lower surface 111 of collector plate 100.

FIG. 5 is a partial side cross-sectional view of an embodiment of an energy storage device 10a that includes the collector plate 100 and jellyroll 30 of FIG. 4. When portions 112 extend into or through apertures 106, most of portions 112 can have reduced bending, relative to portions 114, described further below, about maxis 503 that is transverse relative to jellyroll 30. For example, portions 112 can be relatively straight with respect to lines running parallel with the longitudinal axis 504, when portions 112 are extended through apertures 106. Some amount of bending of portions 112 relative to axes 503 and 504 may occur. For example, portions 112 may have some bending about axis 503 in areas proximate to the edges of apertures 106. For example, portions 112 can include body engagement sections 112a which may extend into apertures 106 and engage with body 101. For example, body engagement section 112a can extend at least partially into aperture 106 and engage with the inner surface 118 within the aperture 106 of body 101. Body engagement section 112a can extend completely through body 101 and engage with the inner surface 118 of body 101. In some embodiments, the body engagement section 112a can extend completely through body 101, and engage with a portion of the upper surface 116 of the support member 102, as shown, when collector plate 100 is pressed against jelly roll 30. Body engagement section 112a can engage with surface 116 and/or 118, through direct contact, and in some embodiments, can even be biased against these surfaces. Engagement sections 112a provide additional strength and stability in the connection between the jellyroll 30 and the collector plate 100. For example, the contact between sections 112a with the upper surface 116 and/or the inner surface 118, can provide additional strength in longitudinal and/or transverse directions. This in turn reduces failure as a result of shear and vibrational forces, and increases device reliability. Some additional minor bending throughout the remainder of sections 112, which is less, relative to the bending of portions 114 and engagement sections 112a, may also occur due to the forces of pressing jellyroll 30 and plate 100 together. It will also be understood that portions 112 are bent around longitudinal axis 504 to form the jellyroll 30.

Portions 112 can form a series of layers of the free ends 37a, while generally retaining some spacing between the layers, the majority of which are bent less, with respect to transverse axis 503, and relative to the bending of the free ends of conventional collector plates and of portions 114, when collector plate 100 is pressed against jellyroll 30. Such embodiments can allow electrolyte 40 to flow into and between the layers of the free ends 37a, as illustrated by the directional arrows 502. Such embodiments reduce the flow restriction of electrolyte through the collector plate 100 and into jellyroll 30, and thus decrease the time for electrolyte impregnation into jellyroll 30. In at least one embodiment, the time for electrolyte impregnation of a similar energy storage device with a conventional collector plate, relative to that of an embodiment similar to that shown in FIG. 5, was reduced from approximately 15 minutes to approximately 15 seconds. Thus, impregnation time can be reduced to less than approximately 15 minutes, less than approximately 10 minutes, less than approximately 5 minutes, less than approximately 1 minute, and less than approximately 30 seconds. It will be understood that portions 112 need not be completely straight or unbent, and that the improvements in flow described herein can be achieved while still allowing some level of bending between the unbent portions 112, as described above.

Aperture 106 can have any of a number of different regular or irregular cross-sectional shapes suitable to receive portions 112 and provide the functionality described herein. Aperture 106 can be a circle, oval, rectangle, square, triangle, sector, or other cross-sectional shape. Aperture 106 can include approximately straight and/or curved edges, or any combination thereof. Additionally, collector plate 100 can be configured to include different quantities of apertures 106. For example, a single aperture 106 with sufficient cross sectional area to receive unbent portion 112, as noted above, can extend into body 101. The single aperture 106 can be supported by a single support member 103 that forms a perimeter around the aperture 106. Such an embodiment is described further below with respect to FIG. 6C. In embodiments with two or more apertures, the apertures can be approximately the same shape, or different shapes with respect to each other.

Aperture 106 can have a cross-sectional area sufficiently large to allow portion 112 to extend into or through aperture 106 and body 101, and provide the aspects of increased electrolyte flow described herein, while still allowing support members 102 to provide sufficient support. Such a cross-sectional area of aperture 106 can be expressed as a percentage of the overall area within a perimeter formed around the bottom surface 111 of body 101. In some embodiments, aperture 106 can have a cross-sectional area greater than or equal to approximately 10%, or in some embodiments, greater than or equal to approximately 20%, or in some embodiments, greater than or equal to approximately 40%, or in some embodiments, greater than or equal to approximately 60%, or in some embodiments, as high as approximately 80% of the overall area within a perimeter formed around the bottom surface 111 of body 101, and provide the functionality described herein.

In embodiments with more than one aperture 106, the total cross-sectional area of all apertures 106 can be sufficiently large to provide the aspects of increased electrolyte flow described herein, while still allowing one or more support members 102 to provide sufficient support. Such a total cross-sectional area of apertures 106 can be expressed as a percentage of the overall area within a perimeter formed around the bottom surface 111 of body 101. In some embodiments, the total cross-sectional area of all apertures 106 can be greater than or equal to approximately 20%, or in some embodiments, greater than or equal to approximately 40%, or in some embodiments, greater than or equal to approximately 60%, or in some embodiments, as high as approximately 80% of the overall area within a perimeter formed around the bottom surface 111 of body 101, and provide the functionality described herein.

The support members 102 can be configured to contact a second portion 114 of free ends 37a when collector plate 100 is pressed longitudinally against the jellyroll 30 in the direction shown by arrow 501. As such, the support members 102 can be generally longitudinally aligned with the second portions 114. The apertures 106 of collector plate 100 can be radially and/or circumferentially offset relative to portions 114 of the free end 37a of jellyroll 30. Due to the offset of portions 114 from apertures 106, portions 114 do not substantially extend through or into apertures 106 when jellyroll 30 is pressed against collector plate 100. Instead, second portion 114 contacts, and thus can be bent, or even flattened, against the lower surface 111 of body 101, when collector plate 100 and jellyroll 30 are pressed against each other.

Aperture(s) 106 and support members 102 can increase the reliability of the attachment of the collector plate 100 to the jelly roll 30. Some collector plates, such as that shown in FIG. 2, contact substantially the entirety of the top surface of the ends of the jellyroll to which the collector plates are attached. Because of this high surface contact area, the amount the ends of the current collector in the jellyroll can be bent by such a collector plate is limited. For example, the ends would partially bend over, without fully flattening or crushing, and at different amounts of bending, providing an unstable, irregular surface, which is unfavorable for reliably welding the jellyroll to the conventional collector plate. The amount of pressure that would be required on the conventional collector plate to distribute forces across and flatten the entire top surface of the jellyroll would have deformed the entire jellyroll, and not just the free ends.

Continuing to refer to FIG. 5, apertures 106 reduce the surface area of the lower surface 111 of the collector plate body 101 that contacts and longitudinally presses against the current collector ends 37*a*. This reduced contact area increases the amount of force applied against the current collector free ends 37*a* for any given pressure. This increased force in turn increases the amount of bending of portions 114 of free ends 37*a*, such that portions 114 can form a substantially flat surface. In some embodiments, portions 114 can be bent or flattened sufficiently such that the percentage of portions 114 of ends 37*a* in electrical contact with the lower surface 111 of the collector plate body 101 is greater than or equal to approximately 80%, or in some embodiments, greater than or equal to approximately 90%, or in some embodiments, greater than or equal to approximately 95%, or in some embodiments, as high as approximately 100%.

In some embodiments, portions 114 can flatten free ends 37*a* by reducing the height $H_1$ of free ends 37*a* (FIG. 1C) by an amount greater than or equal to approximately 60%, or in some embodiments, greater than or equal to approximately 70%, or in some embodiments, greater than or equal to approximately 80%, or in some embodiments as high as approximately 90%. Continuing to refer to FIG. 5, a flatter surface on portions 114 can allow jellyroll 30 to be more reliably attached to the collector plate 100. For example, the flatter surface on portions 114 can allow portions 114 to more easily be scored, and thus can provide better engagement for welding the current collector plate 100 to the jellyroll 30. Thus, a plurality of attachment structures, such as welds 108 between current collector plate 100 and jellyroll 30 can be stronger and more reliable than welds in conventional energy storage devices. Stronger welds can be more resistant to damage by external forces, such as shear and vibrational forces exerted on device 10*a*, for example, in transverse direction 500.

It will be understood that the lower surface 111 of collector plate 100 can provide the aforementioned functionality with different orientations. In some embodiments, the lower surface 111 can extend orthogonally relative to longitudinal axis 504. However, it will be understood that the lower surface 111 of the support members 102 can extend at other angles relative to longitudinal axis 504, and still flatten portions 114 of jellyroll 30.

The support members described herein can be any of a number of different shapes suitable to provide sufficient support to collector plate 100 in the areas not perforated by apertures 106. The support members can include one or more ribs, struts, spokes, or other members separating the apertures 106, such as support members 102. The support members can include one or more rings, frames or other suitable structure that partially or entirely surrounds one or more apertures 106, such as support member 103. The support members can be approximately straight or curved, or can comprise combinations of straight and curved sections. The support members can include two or more sections that are oriented at an angle with respect to each other, such as an angle other than 180 degrees. The support members can extend across some, most, or substantially the entirety of the width of collector plate 100. In embodiments with two or more support members, the support members can be approximately the same sizes and/or shapes, or different sizes and/or shapes with respect to each other. The embodiment of collector plate 100 shown in FIG. 3 includes three sector-shaped apertures 106, surrounded by a ring-shaped support member 103, and three spoke-like support members 102 extending outwardly from a central portion 105 of the body 101 to the ring-shaped support member 103.

Figure 6A:
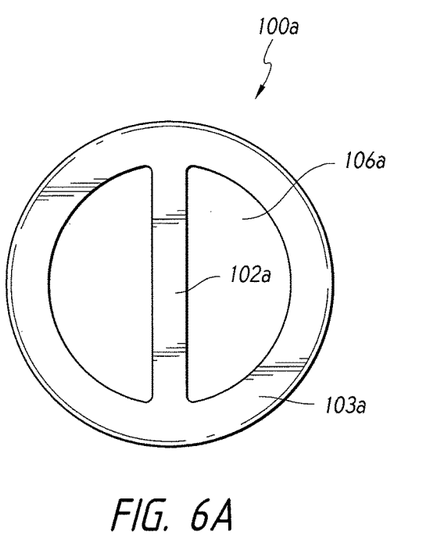
FIGS. 6A-6C are top plan views of embodiments of collector plates.
Figure 6B:
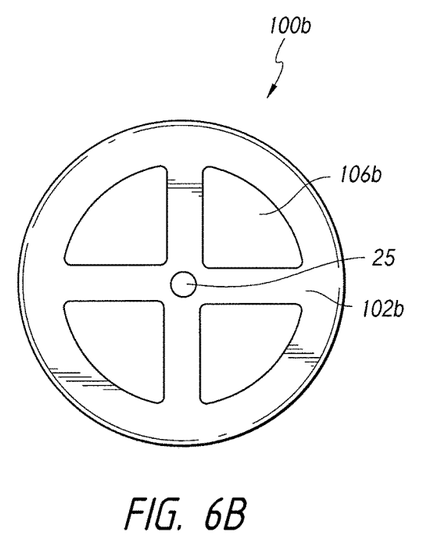
Figure 6C:
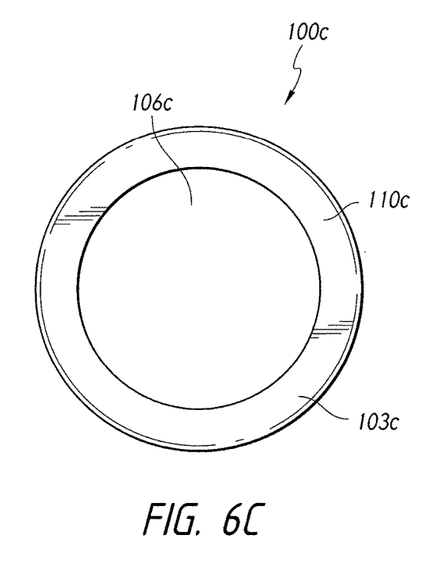

FIGS. 6A-6C are top plan views of other embodiments of collector plates 100*a*-100*c*, respectively. Plates 100*a*-100*c* can include similar features as plate 100 (FIGS. 3-5). FIG. 6A illustrates an embodiment of collector plate 100*a* that includes two apertures 106*a*, with a single support member 102*a* positioned therebetween. Support member 102*a* can extend across opposed sides of support member 103*a*. Apertures 106*a* can be approximately sector-shaped. Support member 102*a* can extend across the approximate center of plate 100*a*, such that two apertures 106*a* are of approximately equal size. FIG. 6B illustrates an embodiment of collector plate 100*b* that includes four apertures 106*b*, within four support members 102*b* positioned therebetween. FIG. 6C illustrates an embodiment of collector plate 100*c* with a single aperture 106*c* that is surrounded and supported by a single support member 103*c*. The aperture 106*c* can be approximately circular, and the support member 103*c* can form a ring around aperture 106*c*. Aperture 106*c* can be centered or off-centered on the surface of collector plate 100*c*.

FIGS. 7A-7D are partial side cross-sectional views of embodiments of collector plates 200*a*-*d*, respectively. Collector plates 200*a*-*d* can be substantially similar to those other embodiments of collector plates described herein. Collector plates 200*a*-*d* can include a protrusion 113 extending from lower surface 111. As described further herein, the protrusions described herein can penetrate a jellyroll, to increase transverse stability and the strength of attachment between the collector plate and jellyroll. For example, the protrusions can reduce the likelihood of failure of the welds between the collector plate and the jellyroll ends, when subjected, for example, to a transverse force (direction 500, FIG. 2). The protrusions can also increase the thickness of some portions of the collector plate, which can increase the strength of the collector plate itself. For example, the protrusions can increase the strength and stability of the collector plate in response to a longitudinal force (direction 501; FIG. 2). Such longitudinal stability can be beneficial, for example, when pressing a jelly roll onto a lower collector plate positioned on the bottom of an energy storage device container, as the forces of such insertion is greater than the forces of pressing the top collector plate onto the jellyroll. Although FIGS. 7A-7D show portions of collector plates 200*a*-*d* with a single protrusion 113, two or more protrusions can be implemented. Additionally, although FIGS. 7A-7D show protrusion 113 approximately centered on the portions of the collector plates 200*a*-*d* shown, one or more protrusions 113 can be offset, spaced, or otherwise positioned in a number of different locations on plates 200a-d. The protrusion 113 can be employed as an alternative to, or in addition to, the other features of the collector plates described herein, such as apertures 106 and support members 102; 103, described with respect to FIGS. 3-6C and 9A-9B. For example, one or more protrusion 113 can extend from the lower surface 111 of support members 102 or 103. One or more protrusion 113 can extend from lower surface 111 proximate to apertures 106, for example, to form a protruding framed perimeter around one or more of apertures 106.

Figure 7A:
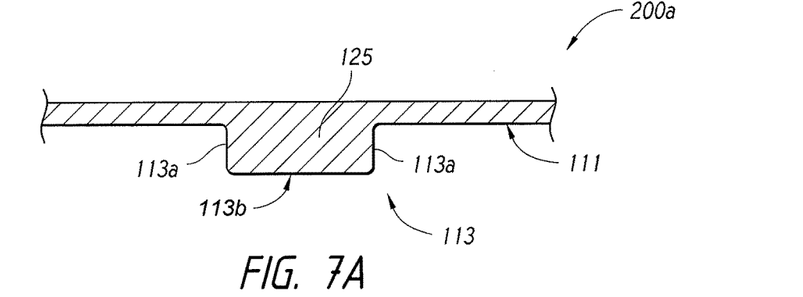
FIGS. 7A-7D are partial side cross-sectional views of embodiments of collector plates.

FIG. 7A illustrates an embodiment of collector plate 200a with a protrusion 113 which can include a protrusion body 125 with sides 113a that extend approximately orthogonally from surface 111. A lower surface 113b of body 125 extends between the ends of sides 113a. Sides 113a can be angled relative to surface 111 to increase the aforementioned penetration and lateral stability provided by protrusion 113. For example, sides 113a can extend outwardly from surface 111 at an acute angle. Surface 113b can be approximately flat, or can be curved or pointed, to affect the penetration and/or lateral stability provided by protrusion 113.

Figure 7B:
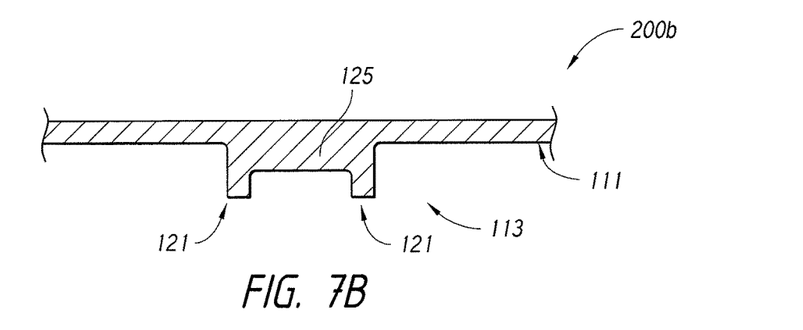

Referring to FIG. 7B, protrusion 113 can include two or more arms 121 extending from surface 111. Arms 121 can extend directly from surface 111, or from an intermediate structure, such as body 125 of protrusion 113. Arms 121 can further increase the penetration and/or lateral stability provided by protrusion 113. Although FIG. 7B is a side cross-sectional view, it will be understood that arms 121 can comprise a plurality of protrusions, or can form a frame or ring-like structure, when viewed from a bottom view.

Figure 7C:
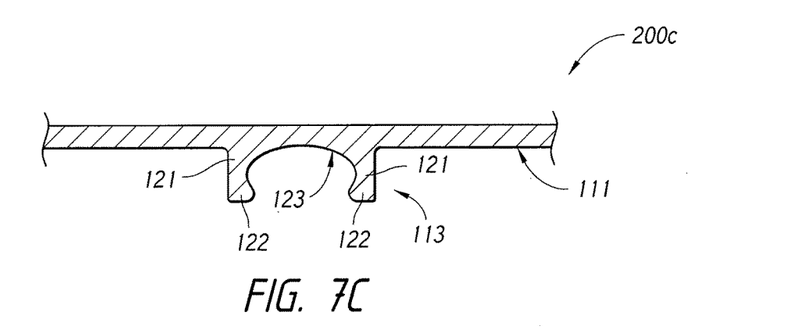
Figure 7D:
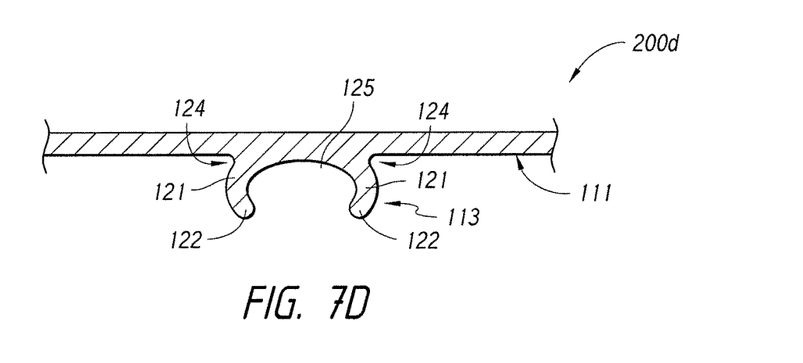

Referring to FIG. 7C, arms 122 of protrusion 113 can include inwardly extending portions 122, to further wrap around a portion of ends 37a (FIG. 8) and provide additional lateral stability and penetration. Inwardly extending portions 122 can be configured as an inwardly-extending flange, for example, if protrusion 113 comprises a frame-like structure. In some embodiments, protrusion 113 can include an inner concavity 123 positioned between arms 121, to provide additional lateral stability and penetration. Referring to FIG. 7D, arms 122 can include a concavity 124 at the interface between arms 121 and surface 111, to provide additional lateral stability and penetration.

Figure 8:
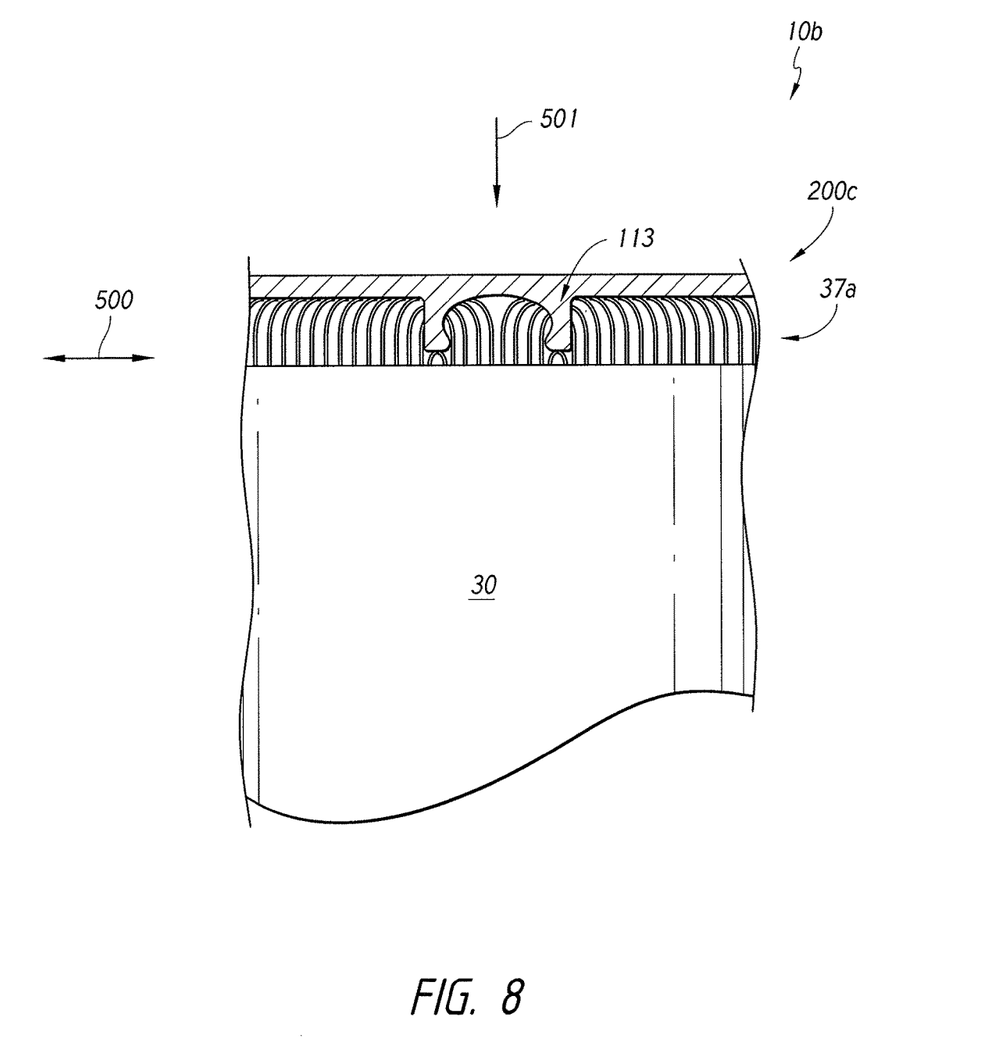
FIG. 8 is a partial side cross-sectional view of an embodiment of an energy storage device including the collector plate of FIG. 7C and a jellyroll.

FIG. 8 is a partial side-cross sectional view of an embodiment of an energy storage device 10b including the collector plate 200c of FIG. 7C and jellyroll 30. When collector plate 200c is pressed against jellyroll 30 in direction 501, protrusion 113 will penetrate a portion of current collector ends 37a, due to its lower surface area and greater proximity to ends 37a relative to lower surface 111. The penetration into ends 37a by protrusion 113 will cause ends 37a to transversely surround portions of protrusion 113, which in turn provides transverse support and stability in the directions shown by arrows 500. Such transverse support can reduce the likelihood of failure of welds or other attachment methods between collector plate 200c and jellyroll 30. Protrusion 113 can have a number of different shapes that may affect the penetration and/or lateral stability it provides with respect to jellyroll 30.

Figure 9A:
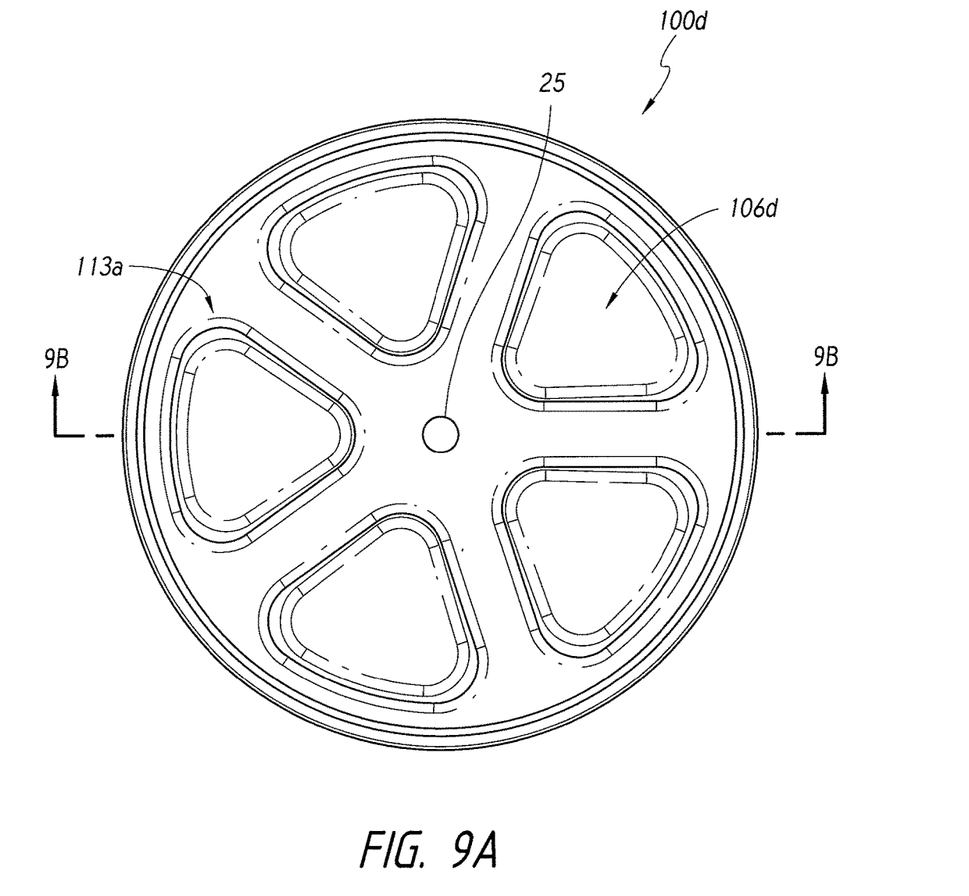
FIGS. 9A-9B are bottom plan view and side cross-sectional views, respectively, of an embodiment of a collector plate.
Figure 9B:
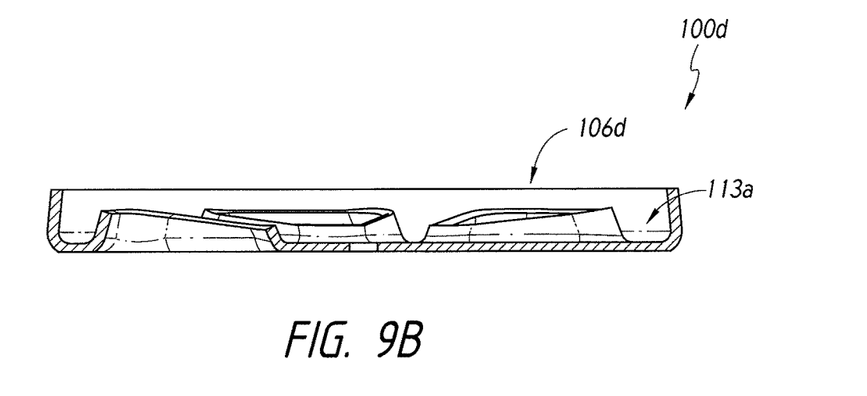

FIGS. 9A-9B are a bottom plan view and side cross-sectional views, respectively, of an embodiment of a collector plate 100d. The collector plate 100d can include five apertures 106d, with a protrusion 113a forming a frame around each aperture 106d. The height of protrusion 113a can vary with respect to the outer perimeter of the collector plate 100d. For example, as best shown in FIG. 9B, the height of the protrusions 113a can increase with increasing distance from the center of the collector plate 100d, to form an inwardly-tapered protruding frame around each aperture 106d, to provide improved engagement with increasing distance from the center of plate 100d.

It will be understood that collector plates with the apertures, support members, and related features, such as those shown in FIGS. 3-6C and 9A-9B, can be used alone or in combination with the protrusions and related features, such as those shown in FIGS. 7A-7D and 8. Additionally, any of the features described herein can be applied to either or both collector plates in any given energy storage device. For example, features described herein of a first collector plate connected to one end of the jellyroll 30, such as free ends 37a and electrode 32, can be similarly applied to a second collector plate connected to the other, opposed, portions of the jellyroll 30, such as free ends 39a and electrode 34 (FIG. 2). Thus, the features of any two collector plates implemented within a given energy storage device can be substantially similar or different with respect to each other. For example, the number of apertures in one collector plate corresponding with a first terminal of an energy storage device may be different than that of a second collector plate corresponding with a second terminal of the energy storage device.

Figure 10:
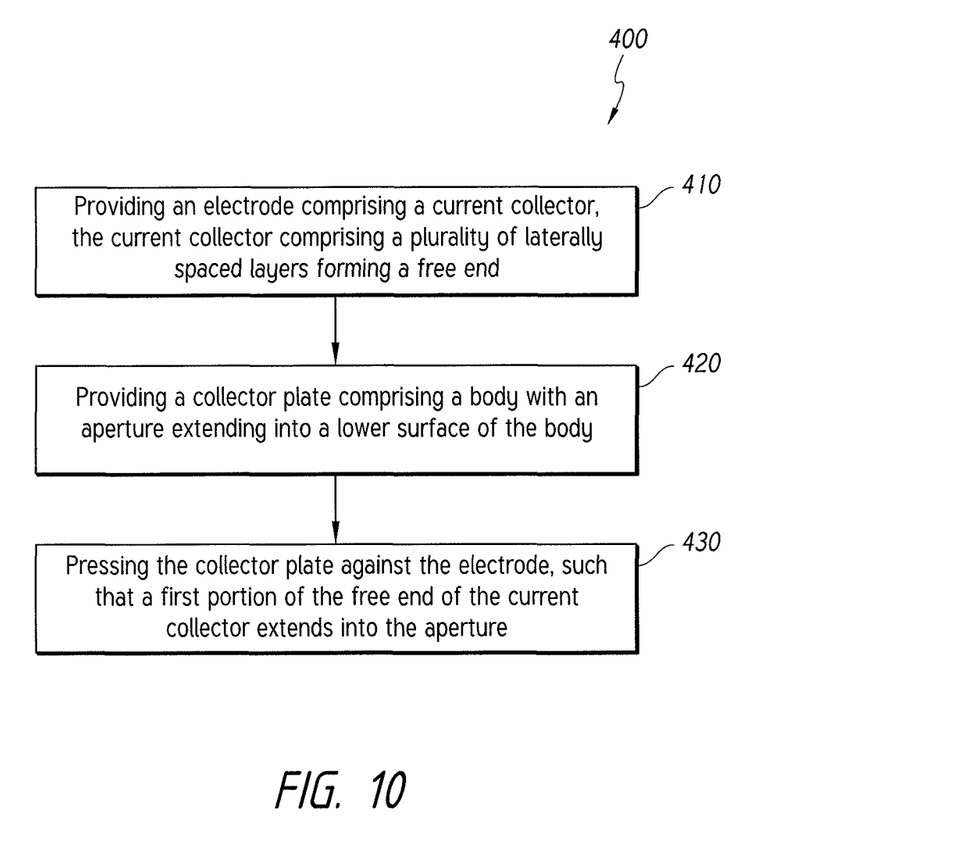
FIG. 10 is an example of a flow diagram illustrating a method of manufacturing an energy storage device.

FIG. 10 is an example of a flow diagram illustrating a method 400 of manufacturing an energy storage device. The method can include providing an electrode comprising a current collector, the current collector comprising a plurality of laterally spaced layers forming a free end, at block 410. The method can further include providing a collector plate comprising a body with an aperture extending into a lower surface of the body at block 420. The method can further include pressing the collector plate against the electrode, such that a first portion of the free end of the current collector extends into the aperture at block 430.

In some implementations, pressing comprises pressing the collector plate against the electrode such that the first portion of the free end extends completely through the thickness of the collector plate. In some implementations, pressing comprises flattening a second portion of the free end of the current collector against the lower surface of the body. In some implementations, flattening comprises reducing the height of the free ends by an amount greater than or equal to approximately 60%. In some implementations, the method further comprises attaching the second portion of the free end to the collector plate. In some implementations, attaching comprises welding. In some implementations, pressing comprises pressing the collector plate against the electrode, such that a protrusion extending from a lower surface of the body penetrates the first portion of the free end. In some implementations, the method further comprises inserting the electrode into a container, and filling the container with electrolyte, wherein filling comprises impregnating the electrode with electrolyte in less than 15 minutes. The aforementioned methods can be employed, for example, with embodiments of the collector plates described herein, such as those shown in FIGS. 3-9B.

It will be understood that the energy storage devices described herein are not limited to a jellyroll, and can be employed in stacked or flat electrode configuration.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

While the above description has pointed out novel features of the invention as applied to various embodiments, the skilled person will understand that various omissions, substitutions, and changes in the form and details of the device or process illustrated may be made without departing from the scope of the invention.

What is claimed is:

1. An energy storage device, comprising:
an electrode comprising a current collector, the current collector comprising a plurality of laterally spaced layers forming a free end;
a container configured to receive the electrode and an electrolyte; and
a collector plate comprising a body with two or more apertures, a first support member extending between two adjacent apertures of the two or more apertures, and a second support member extending around the two or more apertures and the first support member, the two or more apertures extending into a lower surface of the body, and configured to provide flow through the body, wherein a first portion of the free end of the current collector extends into the two or more apertures when the current collector is pressed against the collector plate.

2. The energy storage device of claim 1, wherein the first support member comprises at least four spokes extending from a central portion of the body; the body further comprising the second support member comprising an outer ring, wherein the two or more apertures comprise at least four apertures positioned between the spokes.

3. The energy storage device of claim 1, wherein the second support member comprises a ring extending around the two or more apertures.

4. The energy storage device of claim 1, wherein the apertures have a total cross-sectional area greater than or equal to approximately 10% of the overall area within a perimeter formed around a bottom surface of the body.

5. The energy storage device of claim 1, wherein the electrode comprises a spirally wound electrode.

6. The energy storage device of claim 1, wherein the energy storage device comprises a capacitor.

7. The energy storage device of claim 1, further comprising the electrolyte.

8. The energy storage device of claim 1, wherein the collector plate further comprises at least one protrusion extending from the lower surface of the body, each protrusion configured to penetrate the free end of the current collector when the current collector is pressed against the collector plate.

9. The energy storage device of claim 8, wherein each protrusion forms a perimeter around a corresponding aperture of the two or more apertures.

10. The energy storage device of claim 8, wherein the at least one protrusion extends approximately orthogonally from the lower surface of the body.

11. The energy storage device of claim 1, wherein the first portion of the free end of the current collector extends completely through the body.

12. The energy storage device of claim 1, wherein the first portion of the free end of the current collector includes a body engagement section that extends into the two or more apertures, and engages an inner surface of the body.

13. The energy storage device of claim 12, wherein the body engagement section extends completely through the body, and engages an upper surface of the body.

14. The energy storage device of claim 1, wherein a portion of the lower surface of the body contacts a second portion of the free end of the current collector when the first portion of the free end of the current collector extends into the two or more apertures.

15. The energy storage device of claim 14, further comprising a weld to attach the collector plate to the second portion of the free end of the current collector.

16. The energy storage device of claim 1, further comprising a sidewall extending from the second support member around at least a portion of the electrode.

17. A method of manufacturing an energy storage device, comprising:
providing an electrode comprising a current collector, the current collector comprising a plurality of laterally spaced layers forming a free end;
providing a collector plate comprising a body with two or more apertures extending into a lower surface of the body, a first support member extending between two adjacent apertures of the two or more apertures, and a second support member extending around the two or more apertures and the first support member; and
pressing the collector plate against the electrode, such that a first portion of the free end of the current collector extends into the two or more apertures.

18. The method of claim 17, wherein pressing comprises engaging the first portion of the free end with an inner surface of the body.

19. The method of claim 17, wherein pressing comprises pressing the collector plate against the electrode such that the first portion of the free end extends completely through the thickness of the collector plate.

20. The method of claim 19, wherein pressing comprises engaging the first portion of the free end with an upper surface of the body.

21. The method of claim 17, wherein pressing comprises flattening a second portion of the free end of the current collector against the lower surface of the body.

22. The method of claim 21, wherein flattening comprises reducing the height of the free ends by an amount greater than or equal to approximately 60%.

23. The method of claim 21, further comprising attaching the second portion of the free end to the collector plate.

24. The method of claim 23, wherein attaching comprises welding.

25. The method of claim 17, wherein pressing comprises pressing the collector plate against the electrode, such that a protrusion extending from a lower surface of the body penetrates the first portion of the free end.

26. The method of claim 17, further comprising inserting the electrode into a container, and filling the container with electrolyte, wherein filling comprises impregnating the electrode with electrolyte in less than 15 minutes.

* * * * *